United States Patent

Braun et al.

[15] 3,639,690

[45] Feb. 1, 1972

[54] DIGITAL PRIVACY SYSTEM

[72] Inventors: William V. Braun; Albert J. Leitich, both of Chicago, Ill.

[73] Assignee: Motorola, Inc., Franklin Park, Ill.

[22] Filed: Sept. 10, 1969

[21] Appl. No.: 856,714

[52] U.S. Cl. ........ 178/22

[51] Int. Cl. ........ H04l 9/04

[58] Field of Search ........ 178/22; 179/1.5

[56] References Cited

UNITED STATES PATENTS

| | | | |
|---|---|---|---|
| 3,202,764 | 8/1965 | Adams et al. | 179/1.5 |
| 3,307,648 | 3/1967 | Masterson | 340/15.5 UX |
| 3,506,783 | 4/1970 | Mo et al | 178/22 |
| 3,507,980 | 4/1970 | Rugaber et al | 179/1.5 |

*Primary Examiner*—Rodney D. Bennett, Jr.
*Assistant Examiner*—N. Moskowitz
*Attorney*—Mueller & Aichele

[57] ABSTRACT

A digital voice-privacy system uses a delta modulator to convert voice information to digital data which then is encoded by combining the output of the delta modulator with a digital signal derived from selected stages or a shift register and a programmable code memory with the resultant data train being fed back as the input signal train for the shift register. The output of the last stage of the shift register is the encoded data. The data is decoded by a similar system, with the received signals being supplied to the input of a shift register and programmable code memory circuit comparable to the one used in the encoder to form a decoding signal which is combined with the encoded digital data to provide an output to a delta demodulator, the output of which then is the desired decoded voice information.

15 Claims, 2 Drawing Figures

INVENTORS
WILLIAM V. BRAUN
ALBERT J. LEITICH
BY Mueller, Aichele & Rauner
ATTORNEYS

INVENTORS
WILLIAM V. BRAUN
ALBERT J. LEITICH

BY Mueller, Aichele & Rauner
ATTORNEYS.

DIGITAL PRIVACY SYSTEM

BACKGROUND OF THE INVENTION

In the operation of some two-way-radio systems it is desirable to prevent the unauthorized reception of information, such as in the operation of police-radio systems in which it is desirable to have only authorized receivers capable of receiving intelligible information transmitted in the system, or in systems transmitting private data over common carrier transmission links. Generally, systems for providing privacy in the transmission of information or data of either of the types mentioned above are relatively complex, involving a relatively large number of components. If relatively simple systems are used, such as in commercially available voice-privacy systems using frequency inversion, masking or band splitting and random inversion, secure scrambling of the information is not obtained. In addition, if a receiver in a privacy system is stolen or otherwise falls into unauthorized hands, it is desirable to provide some means to automatically render such a receiver incapable of decoding information being transmitted over the system.

SUMMARY OF THE INVENTION

Accordingly, it is an object of this invention to provide an improved privacy-transmission system.

It is an additional object of this invention to provide a unique voice-privacy system in which the voice or audio signals are transformed into binary signals representative thereof, with the binary signals being scrambled to insure privacy of the transmission.

It is another object of this invention to obtain a digital-privacy system using a shift register feedback circuit with gating functions and a volatile code storage, which is programmable at the transmitting and receiving stations to provide a variable encoding and decoding key for the system.

In accordance with a preferred embodiment of this invention, digital signals to be encoded are supplied to a first EXCLUSIVE OR gate, the output of which is fed to the input of a multistage shift register. The outputs of selected ones of the stages of the shift register are applied to corresponding gating circuits, other inputs to which are obtained from a code memory. The outputs of the gating circuits then are supplied to an EXCLUSIVE OR-gate tree, with the output of the EXCLUSIVE OR-gate tree being supplied as the other input to the first EXCLUSIVE OR gate to complete the encoding feedback loop for the information. The encoded data then is obtained from the output of the shift register.

Decoding is accomplished by a similar circuit, with the received data being supplied to the input of the shift register and with the feedback loop being broken. The output of the EXCLUSIVE OR-gate tree is combined in a further EXCLUSIVE OR gate with the received data to reproduce the original train of binary digital signals.

DETAILED DESCRIPTION

Figure 1:
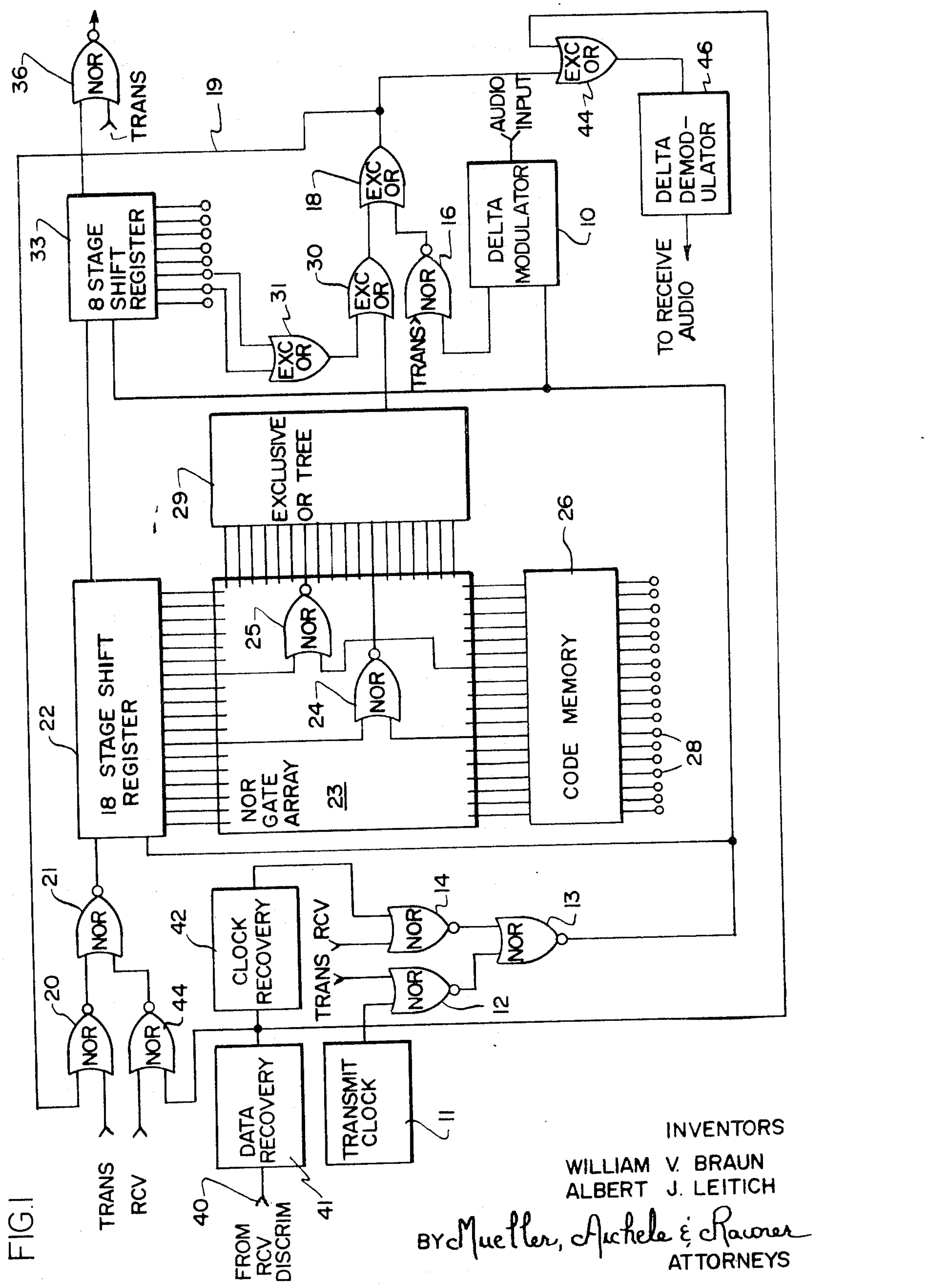
FIG. 1 is a block diagram of a preferred embodiment of the invention.

Referring now to FIG. 1, there is shown a transmit/receive circuit which may be used to transform voice into encoded binary signals and which may be used to decode such encoded binary signals to reproduce the original voice signals, with the system providing privacy against unauthorized receivers. The system shown in FIG. 1 operates on digital information, and the audio or voice input signals are supplied to a delta modulator 10 which is used to transform the audio input into a binary signal train at a predetermined clock rate establishing by a clock circuit 11.

When the circuit shown in FIG. 1 is operated in a transmit or encoding mode, the inputs labeled TRANS are provided with a low DC control signal and the inputs labeled RCV are provided with a high DC control signal. When the circuit is operated in its receive mode or decoding mode, the inputs marked RCV are provided with a low DC control signal level, and the inputs labeled TRANS are provided with a high DC control signal level.

The transmit clock circuit 11 supplies output signals to a NOR-gate 12, the other input to which is the TRANS input, which is low for the transmit mode of operation. Thus, for the transmit mode of operation, the square wave pulses from the clock 11 are reproduced at the output of the NOR-gate 12 and are supplied to one of the inputs of a second NOR-gate 13. The other input to the NOR-gate 13 is obtained from a NOR-gate 14, with the output obtained from the NOR-gate 14 being permanently low in the transmit mode of operation, since one of the inputs to the NOR-gate 14 is the high input supplied thereto from a RCV control input. As a consequence, the NOR-gate 13 passes the square wave clock signal to drive the delta modulator 10 to produce a sequence of binary signals in the form of a serial binary train.

This signal train of binary data bits is supplied through a NOR-gate switch 16, the other input to which is low for the TRANS mode of operation; so that the output of the NOR-gate 16 is a reproduction of the signals obtained from the output of the delta modulator 10. These signals are supplied as one input to an EXCLUSIVE OR-gate 18, the output of which in turn is applied over a lead 19 to the input of another NOR-gate switch 20, the other input of which is low for the transmit mode; so that the NOR-gate 20 passes the signals through a further NOR-gate 21 (the other input to which is low) to the input of the first stage of an 18-stage shift register 22. Clock pulses for operating the shift register 22 also are obtained from the output of the NOR-gate 13, so that the shift register is operated in synchronism with the operation of the delta modulator 10 to shift the data therethrough at the same rate that the data is obtained from the delta modulator 10.

In order to encode or scramble the information obtained from the delta modulator 10, a NOR-gate array 23 is provided and includes a NOR gate corresponding to each of the 18 stages of the shift register 22. In order to avoid unnecessarily cluttering the drawing, only two of the 18 NOR gates are shown and these two NOR gates are indicated as the NOR-gates 24 and 25, having inputs obtained from the seventh and 12th stages of the shift register 22. The other inputs to each of the 18 NOR gates in the NOR-gate array 23 are obtained from a code memory bank 26, which also has 18 outputs, corresponding to the 18 stages of the shift register 22. Each of these 18 outputs is connected to a different one of the NOR gates in the NOR-gate array 23.

The code memory 26 may be of any suitable type, which in its simplest form could constitute a plurality of toggle switches capable of connection to positive and negative voltage supplies and being normally connected to a positive supply; so that the NOR-gates would be disabled since a positive output applied to an input of a NOR gate provides a low output therefrom. Thus, in the nonselected state, the output from each of the output leads of the code memory 26 is a high or a relatively positive output. In order to select selected ones of the NOR-gates in the NOR-gate array 23 for unique encoding for the system, randomly selected ones of the outputs of the code memory 26 are caused to be at a low or relatively negative potential.

For the purposes of illustration, assume that the NOR-gates 24 and 25 are selected NOR gates having a low potential applied to their lower inputs from the code memory 26. As a consequence, whenever the information in the stage of the shift register supplying the other input to the NOR-gates 24 and 25 is at a low potential, the output of the NOR-gate 24 or 25 is high; and whenever the output from the corresponding stage of the shift register 22 is high, the output of the NOR-gate 24 or 25 is low. For NOR gates which are not selected by the code memory 26, that is NOR gates having a positive or high input applied thereto from the code memory 26, the outputs are held at a low potential and are not affected by the changes in the information passing through the stages of the shift register 22.

In a preferred form of the invention, the code memory 26 is an electronic memory consisting of 18 bistable storage devices, each provided with an input indicated as inputs 28 in the drawing. The bistable memory elements in the code memory 26 may be constructed so that when power is initially applied to the circuit, all of the outputs from the stages of the code memory 26 are high; so that no NOR gates in the NOR-gate array 23 are selected. In order to set the code memory 26 in accordance with a predetermined code pattern, selected ones of the inputs 28 are supplied with a trigger pulse in order to cause the outputs of the selected stages of the code memory 26 to drop to a relatively low potential to enable the corresponding NOR gates in the NOR-gate array 23.

By providing a memory of this type, unauthorized use of the encoding system is prevented in the event that the system is stolen, since in order to remove the system from its normal operating environment the power normally necessarily would be disconnected. Reestablishment of the power thereafter causes all of the outputs from the code memory 26 to be relatively high potential, so that the stolen encoder can not be used to provide unauthorized reception of information in the system from which it was removed.

The use of an electronic code memory 26, employing a plurality of bistable devices, also provides a ready means for setting or changing the codes of the code memories in a number of different units used in the system from a common source; so that erroneous settings are substantially reduced. By providing a single location for setting each of the code memories 26 used in the different units of a system by the application of selected input pulses to the terminals 28, all of the codes in the units used in the system can be changed at predetermined intervals at the will of the operators of the system.

The outputs of the 18 NOR gates in the NOR-gate array 23 are applied as inputs to an EXCLUSIVE OR-gate tree 29; and since the nonselected NOR gates of the NOR-gate array 23 all provide a low output, the output obtained from the EXCLUSIVE OR-gate tree 29 is affected only by the NOR gates in the NOR-gate array 23 which have been selected or enabled by the application of a low input thereto from the code memory 26. The signals obtained from the EXCLUSIVE OR-gate tree 29 indicate the odd/even status of the enabled NOR gates in the array 23 and are applied as one input to another EXCLUSIVE OR-gate 30, the other input of which is obtained from an EXCLUSIVE OR-gate 31, having a pair of inputs obtained from a selected pair of stages of an eight-stage shift register 33.

Input signals for the shift register 33 are obtained from the output stage of the 18-stage shift register 22 and constitute the serial information which has passed through the shift register 22. Provision is made for obtaining the two inputs to the EXCLUSIVE OR-gate 31 from any two of the eight stages of the shift register 33 in order to provide additional encoding of the information passing through the system. The output of the EXCLUSIVE OR-gate 30 then constitutes a scrambled version of the recirculated signal obtained from the delta modulator 10 and is combined with the output signals or train of data bits obtained from the delta modulator 10 in the EXCLUSIVE OR-gate 18 to provide the signals on the lead 19 which are passed through the NOR-gates 20 and 21 and the shift registers 22 and 33. The transmitted signals in the form of an encoded or scrambled train of data bits are obtained from the final stage of the eight-stage shift register 33 and are passed through a final NOR-gate 36 to the input of a conventional, wide band radio transmitter (not shown) of the type normally used in mobile radiocommunications systems.

The eight-stage shift register 33 and the EXCLUSIVE OR-gate 31 are provided to establish additional security in the event that the encoder/decoder system shown in FIG. 1 is stolen from a system operating in one area and is transported to another area, and an attempt is made to utilize the stolen equipment to receive data being transmitted in the second area. Different areas can be provided with wired outputs from different pairs of the stages of the eight-stage shift register 33; so that even though the code memory for a given area could be ascertained, a receiver from a different area would not be able to encode or decode information in the system, due to the fact that the wiring from the eight-stage shift register 33 to the inputs of the EXCLUSIVE OR-gate 31 differs from area to area. If this provision is not desired, the additional shift register 33 and the EXCLUSIVE OR-gates 31 and 30 can be eliminated from the system. Of course, it will be apparent to those skilled in the art that the number of stages in the shift registers 22 and 33 may be varied with a corresponding variation in the NOR gates of the NOR-gate array 23 and the code memory 26, as desired.

When the system is operated in its receive mode of operation, the inputs marked RCV in FIG. 1 are low and the inputs marked TRANS are high, as described previously. With the input TRANS to the NOR-gate 20 being high, the feedback loop over the lead 19 to the 18-stage shift register 22 is broken. Information received from the receiving discriminator of a conventional receiver such as used in mobile radiocommunications, is applied from an input terminal 40 to a data recovery circuit 41, which provides at its output the encoded digital data which originally is obtained from the NOR-gate 36 of a unit operating in the transmit mode of operation. A clock recovery circuit 42, which may be of a conventional type, recovers the clock pulse rate for the digital data at the output of the data recovery circuit 41, and supplies clock pulses through a now enabled NOR-gate 14 and the NOR-gate 13 to produce the operating clock pulses for the system operating in its receive mode of operation. It should be noted that the high TRANS input applied to the NOR-gate 12 prevents the transmitter clock 11 from providing clock pulses when this system is operated in its receive mode.

The received data at the output of the data recovery circuit 41 also is applied through a now enabled NOR-gate switch 44 and the NOR-gate 21 to the input of the 18-stage shift register 22, and this data is shifted through the shift register 22 at the received bit rate under the control of the recovered clock pulses obtained from the output of the NOR-gate 13. The code memory 26 in the receiver is set to enable the same NOR gates in the NOR-gate array 23 of the receiver as were enabled in the transmitter, so that the inputs to the EXCLUSIVE OR-gate tree 29 in a station operated in the receive mode are obtained from the same NOR gates that were used to encode the information in a station of the system operating in its transmit mode.

At the same time, the encoded data obtained from the output of the data recovery circuit 41 is applied as one input to an EXCLUSIVE OR-gate 44, the other input to which is the scrambled information obtained from the output of the EXCLUSIVE OR-gate 18. The output of the EXCLUSIVE OR-gate 44 then is the same digital information which originally was obtained from the delta modulator 10 in a station operating in its transmit mode, and this information is applied to a conventional delta demodulator 46 which reproduces the original audio input as a received audio signal.

Figure 2:
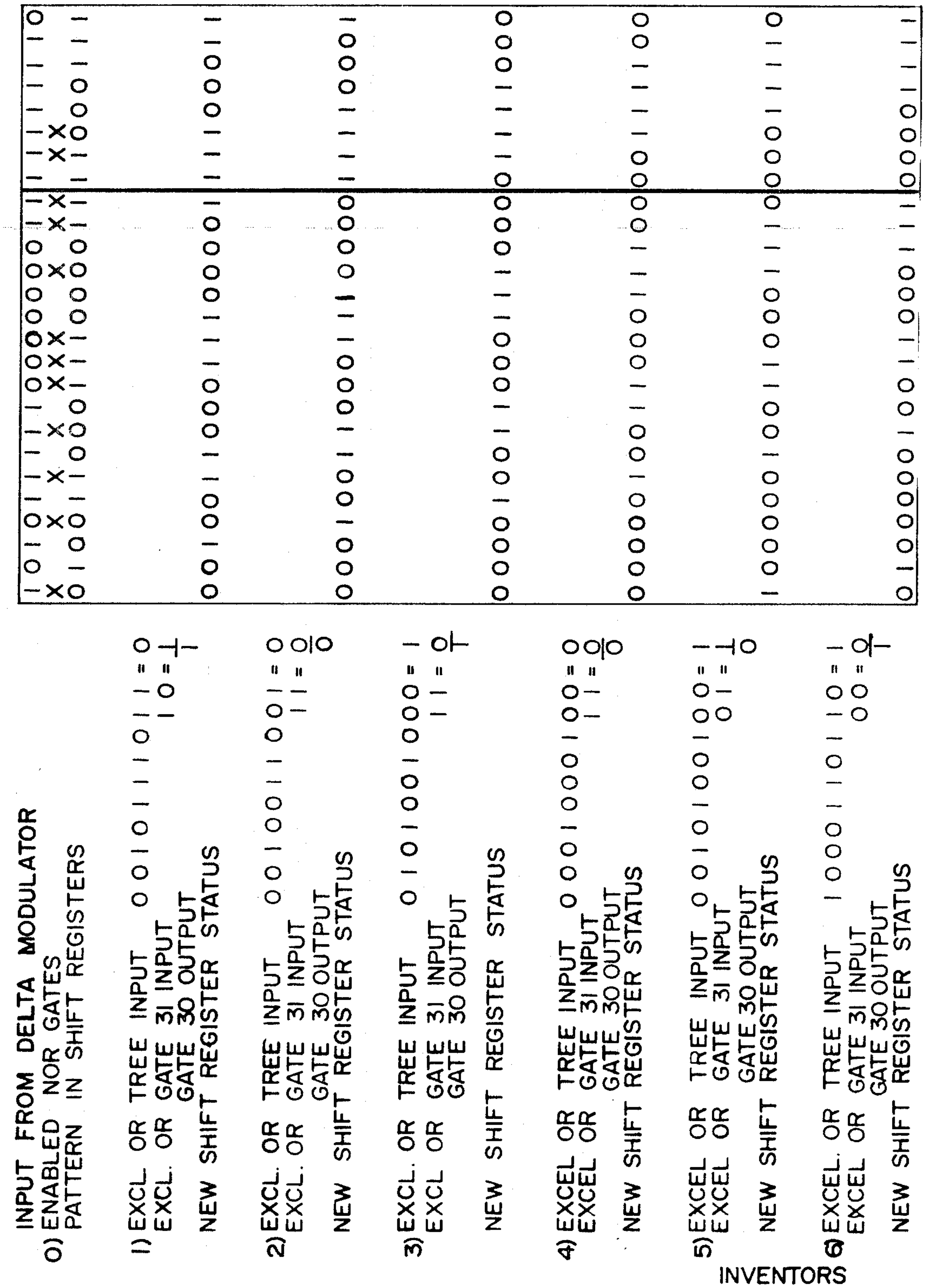
FIG. 2 is a chart useful in describing the encoding sequence performed by the circuit of FIG. 1.

Referring now to FIG. 2 there is shown a chart which is considered helpful in understanding the operation of the circuit shown in FIG. 1 and described above. The chart in FIG. 2 illustrates the manner in which the signals obtained from the output of the delta modulator 10 are modified by the system operating in its transmit or encode mode of operation. In FIG. 2, the top line of the chart is labeled "Input From Delta Modulator" and shows 26 binary bits arranged in a random serial sequence of "1" and "0." These bits occur in time from left to right in the chart, so that the first bit is a binary "1," the second bit is a binary "0" the third a "1," the fourth a "0," etc.

Assume that the pattern of binary data in the shift registers 22 and 33 at the start of the transmission is as shown in the third line of section 0 of FIG. 2. The binary information stored in the 18-stage shift register 22 is shown on the left side of the heavy vertical line in the chart, with the binary information stored in the eight-stage shift register 33 being shown to the right of the heavy line. Since the shift registers 22 and 33 are operated in synchronism, with the output of the 18-stage shift register 22 supplying the input signals to the eight-stage shift register 33, the shift registers effectively operate as a 26-stage shift register, with the output signals being obtained from the last stage of the shift register 33. In the chart shown in FIG. 2, the output signals are the data bits in the right-hand vertical column from top to bottom in sequence.

The pattern in the shift registers 22 and 33 is a random pattern which has no correlation with the input from the delta modulator 10 when the system initially is placed in operation. It is not necessary to clear the shift registers since the digital rate of operation of the system is sufficiently high so that only an insignificant amount of data is lost due to the initial 26 noncoherent bits which are obtained from the output of the shift register 33.

In the initial operating condition and during the continued operation of the system, selected ones of the NOR gates in the NOR-gate array 23 are enabled, and these are shown by X's in the second line of section "0" of FIG. 2. The enabled NOR gates correspond to the stages of the shift registers above which the X's are placed, and the nonselected NOR gates are indicated by the unmarked sections directly above the shift register pattern shown on the third line of section "0." Ten NOR gates are selected, corresponding to various ones of the 18 stages of the shift register 22, such as the first, fourth, sixth, eighth, etc. The two selected outputs from the eight-stage shift register 33 are indicated by the X's directly above the second and third stage pattern for the register 33 shown in line 3 of section "0" FIG. 2.

The foregoing is the starting condition for operation of the system in an encode mode of operation. In section 1 of FIG. 2, the input to the EXCLUSIVE OR-gate tree 29 from the 10 selected NOR gates is shown, with a "0" or low output being indicated from a selected or enabled NOR gate when the corresponding stage of the shift register is storing a binary "0." A binary "0" is represented by a high output from a stage of the shift register, with a binary "1" in a stage of the shift register being represented by a low output. In order for a NOR gate to provide a high or "1" output, it is necessary that both of the inputs thereto are low, thereby indicating the selection of the NOR gate and the storage of a binary 1 in the corresponding stage of the shift register 22.

Since the number of high outputs of the selected NOR gates for section 1 of FIG. 2, corresponding to the first time interval or clock pulse, is even, the output of the EXCLUSIVE OR gates tree 29 is low or "0" as indicated. At the same time, the two stages of the shift register 33 supplying the input signals to the EXCLUSIVE OR-gate 31 are storing a binary 1 and a binary 0, causing a high or "1" output to be obtained from the EXCLUSIVE OR-gate 31. These two outputs then are added in the EXCLUSIVE OR-gate 30 to produce a "1" high output which is applied as a "1" input to the EXCLUSIVE OR-gate 18.

At this time, the first output from the delta modulator 10 is a binary 1, as indicated on the first line of FIG. 2. This binary "1" is in the form of a low output from the delta modulator 10 which causes a high output to be obtained from the NOR-gate 16, causing a "1" or high input to be applied to the other input of the EXCLUSIVE OR-gate 18 at this first time interval. This in turn causes the output of the EXCLUSIVE OR-gate 18 to be low, resulting in the storage of a binary "0" in the first or input stage of the shift register 22 upon the application of the first clock pulse to the system. This then moves all of the information in the shift registers one place to the right as seen in the "new shift register status" under section 1 of FIG. 2, and causes a binary "0" to be placed in the first or input stage of the shift register 22. The binary 1 originally stored in the last stage of the shift register 33 then is applied to the NOR-gate 36 as the first output bit from the system operating in its transmit mode.

With the new information stored in shift registers 22 and 33 as shown in the "new shift register status" of section 1, the EXCLUSIVE OR gate tree input is as shown in section 2, and again includes an even number of binary "1's," resulting in a "0" output from the EXCLUSIVE OR-gate tree 29. At the same time, the two input signals to the EXCLUSIVE OR-gate 31 are binary "1's" causing a "0" output to be obtained from the EXCLUSIVE OR-gate 31. Addition of these two signals in the EXCLUSIVE OR-gate 30 provides a "0" output, and this output is combined in the EXCLUSIVE OR-gate 18 with the "0" output obtained as the second pulse from the delta modulator 10 to provide a second "0" input to the shift register 22. The next clock pulse then results in the "new shift register status" shown in section 2 of FIG. 2.

The operation is repeated with the next clock pulse, to combine the EXCLUSIVE OR tree output shown in section 3, with the EXCLUSIVE OR-gate 31 output to produce "new shift register status" of section 3 for the third clock pulse. Examination of the subsequent binary signals shown in the remaining sections of FIG. 2 indicates the manner in which the data obtained from the delta modulator 10 is modified and applied to the input of the 18-stage shift register 22.

The operation of the decoder is similar to the operation of the encoder illustrated in FIG. 2 and produces modified data in the same manner; so that when the same NOR gates are enabled in the receiver as are enabled in the transmitter section, the output of the EXCLUSIVE OR-gate 44 in the receiver is a reproduction of the input data from the delta modulator 10 shown on the top line of FIG. 2. This output of the gate 44 then is supplied to a conventional delta demodulator 46 which reproduces the original audio input information.

It should be noted that because the data recovery circuit 40 supplies the data signals to a conventional clock recovery circuit 42, the system is self-synchronizing and does not require any synchronous operation between the transmitting and receiving stations. In addition, there is no need to preset or clear the shift registers 22 and 33, since the amount of data which is lost or garbled due to the information stored in the shift registers upon initial receipt of the information is rapidly cleared and generally amounts to no more than a syllable or partial syllable of speech. As a result, this initial error is too short to be of any consequence in the operation of the system.

It should be noted that the number of NOR gates which are enabled by the output from the code memory 26 causes an error multiplication possibility in the system of $N+1$, where $N$ is the number of outputs used on both of the shift registers 22 and 33 for the encoding or decoding function. As a consequence, it is not desirable to use all or most of the shift register output taps in the NOR-gate array 23 and the inputs to the EXCLUSIVE OR-gate 31, since the probability of errors is multiplied accordingly. The use of 10 outputs of the code memory 26 and two outputs of the shift register stages 33 has been found to provide adequate encoding capabilities for the system.

In the foregoing description of the preferred embodiment of the invention, the system has been described in conjunction with a voice or audio input using delta modulators to produce the digital signals which are encoded by the system. It should also be apparent that the system could be used directly with a digital signal input such as is obtained in telegraphy systems or machine-generated Morse code, since the operation of the encoding and decoding functions is independent of the source of the digital information. It also is apparent that other types of coincidence gates other than NOR gates could be employed in the system with appropriate changes in the signal levels used.

By providing periodic resetting of the code memory 26 in a mobile system in which the system may be used, it is possible to insure, to a relatively high degree, the security of the system and to provide a relatively simple encoding and decoding function for the mobile radios for which the system is used. It also should be noted that the system may be employed with any suitable mobile or stationary transmitting and receiving equipment.

We claim:

1. A privacy encoder for modifying data to be transmitted to a form inhibiting unauthorized reception, including in combination:

means for supplying digital signals in the form of a serial train of binary data bits at a predetermined clock rate;

shift register means with a predetermined number of stages;

a plurality of coincidence gating means each having at least first and second inputs and an output, the first inputs being coupled with the outputs of at least some of the stages of the shift register means;

code memory-storage means connected with the second inputs of at least some of the coincidence gating means for supplying input signals thereto;

first EXCLUSIVE OR gate means connected to the outputs of the coincidence gating means for providing a signal on an output thereof indicative of the odd/even status of the outputs of the coincidence gating means; and second EXCLUSIVE OR gate means having a first input connected with the output of the first EXCLUSIVE OR gate means, having a second input connected with the means for supplying said digital signals, and having an output connected with the input of the shift register means, the modified data being obtained from a predetermined stage of the shift register means.

2. The combination according to claim 1 wherein the means for supplying the digital signals is a delta modulator, the input to which is an audio input to be encoded.

3. The combination according to claim 1 wherein information is stepped serially through the shift register means at a predetermined clock rate of the serial train of binary data bits, the code memory-storage means has a predetermined number of outputs corresponding to the predetermined number of stages in the shift register means, and a coincidence gating means is provided for each of the stages of the shift register means, each gating means having the first input coupled with an output from a different stage of the shift register means and the second input coupled with a different output from the coding means.

4. The combination according to claim 3 wherein the code memory-storage means is a programmable code memory having means for causing different predetermined patterns of outputs to be obtained therefrom.

5. The combination according to claim 4 wherein the code memory is an electronic code memory in which disruption of power to the code memory followed by reestablishment of power causes the code memory to be reset, thereby destroying the code stored therein.

6. The combination according to claim 1 wherein the shift register means includes a first shift register means having a predetermined number of stages with the outputs of at least some of said stages of the first shift register means being coupled with the first inputs of different ones of the coincidence gating means, further EXCLUSIVE OR gate means having a plurality of inputs and an output, and a second shift register means having a predetermined number of stages, with selected ones of the outputs of the stages of the second shift register means being connected with inputs of the further EXCLUSIVE OR gate means, the output of which is coupled in circuit with the output of the first EXCLUSIVE OR gate means to the first input of the second EXCLUSIVE OR gate means.

7. A decoder for a privacy system for decoding modified digital data, including in combination:

means for supplying encoded digital signals in the form of an encoded serial train of binary data bits;

shift register means having a predetermined number of stages and supplied with the received train of data bits at the input thereof;

a plurality of coincidence gating means each having at least first and second inputs and an output, the first inputs being coupled with the outputs of at least some of the stages of the shift register means;

code memory-storage means connected with the second inputs of at least some of the coincidence gating means for supplying input signals thereto;

first EXCLUSIVE OR gate means connected to the outputs of the coincidence gating means for providing a signal on an output thereof indicative of the odd/even status of the outputs of the coincidence gating means; and second EXCLUSIVE OR gate means having a first input connected with the output of the first EXCLUSIVE OR gate means, having a second input supplied with the train of binary data bits, and having an output from which is obtained a decoded train of binary data.

8. The combination according to claim 7 wherein the shift register means includes first shift register means having a first predetermined number of stages, with the outputs of selected ones of said first predetermined number of stages being coupled with the first inputs of selected ones of the coincidence gating means also having corresponding second inputs thereof connected with the code memory storage means;

further EXCLUSIVE OR gate means having a plurality of inputs and an output; and second shift register means having a predetermined number of stages, with selected ones of the outputs of the stages of the second shift register means being connected with inputs of the further EXCLUSIVE OR gate means, the output of which is coupled in circuit with the output of the first EXCLUSIVE OR gate means to the first input of the second EXCLUSIVE OR gate means.

9. The combination according to claim 7 wherein the output of the second EXCLUSIVE OR gate means is supplied to a delta demodulator, and wherein the encoded digital signals applied to the input of the shift register means are derived from delta-modulated audio signals.

10. In a system in which data is transmitted in a form inhibiting unauthorized reception, a circuit for encoding and decoding data includes in combination:

shift register means with a predetermined number of stages;

coincidence-gating means coupled with the outputs of at least some of the stages of the shift register means;

encoding/decoding means for supplying input signals to at least some of the coincidence-gating means;

first EXCLUSIVE OR gate means connected to the outputs of the coincidence-gating means for providing an output indicative of the odd/even status of the outputs of the coincidence-gating means;

first switching means enabled when the system is operated in an encode mode of operation to pass digital signals therethrough and providing a constant level when the system is operated in a decode mode of operation;

second EXCLUSIVE OR gate means provided with input signals from the output of the first EXCLUSIVE OR gate means and the output of the first switching means; OR gate means for supplying encoded digital signals in the form of a serial train of binary data bits;

second switching means enabled when the system is operated in an encode mode of operation and disabled when the system is operated in a decode mode of operation for passing the output signals from the second EXCLUSIVE OR gate means to the input of the shift register means with the system operated in an encode mode of operation;

third switching means coupled to said supplying means and enabled when the system is operated in a decode mode of operation and disabled when the system is operated in an encode mode of operation for supplying said encoded digital signals to the input of the shift register means when the system is operated in a decode mode of operation; and third EXCLUSIVE OR gate means provided with input signals in the form of output of the second EXCLUSIVE OR gate means and said encoded digital signals for providing a decoded serial train of binary data bits at the output thereof when the system is operated in a decode mode of operation.

11. The combination according to claim 10 wherein the digital signals passed by the first switching means with the system operated in its encode mode of operation are obtained from a delta modulator, the input to which is an audio input to be encoded and further wherein the output of the third EXCLUSIVE OR gate means is supplied to a delta demodulator.

12. The combination according to claim 10 wherein the information is stepped serially through the shift register means wherein the encoding/decoding means includes a code memory means having a predetermined number of outputs corresponding to the predetermined number of stages in the shift register means, and wherein coincidence-gating means is provided for each of the stages of the shift register means, each gating means being supplied with an input from a different stage of the shift register means and a different input from the code memory means.

13. The combination according to claim 12 wherein the code memory means is a programmable code memory having means for causing different predetermined patterns of outputs to be obtained therefrom.

14. The combination according to claim 13 wherein the shift register means includes a first shift register means having a predetermined number of stages with the outputs of at least some of said predetermined number of stages of the first shift register means being applied as inputs to different ones of the coincidence-gating means, and a second shift register means having a predetermined number of stages, with selected ones of the outputs of the stages of the second shift register means being applied to a further EXCLUSIVE OR gate means, the output of which is combined with the output of the first EXCLUSIVE OR gate means to form one of the input signals for the second EXCLUSIVE OR gate means.

15. The combination according to claim 7 wherein the code memory-storage means is a programmable electronic code memory having means for causing different predetermined patterns of outputs to be obtained therefrom and in which disruption of power thereto followed by reestablishment of power causes the destruction of the code stored therein.

* * * * *